Sept. 2, 1941.    T. J. STEPHENS    2,254,329
REPLACEABLE TREAD TIRE
Filed June 17, 1939
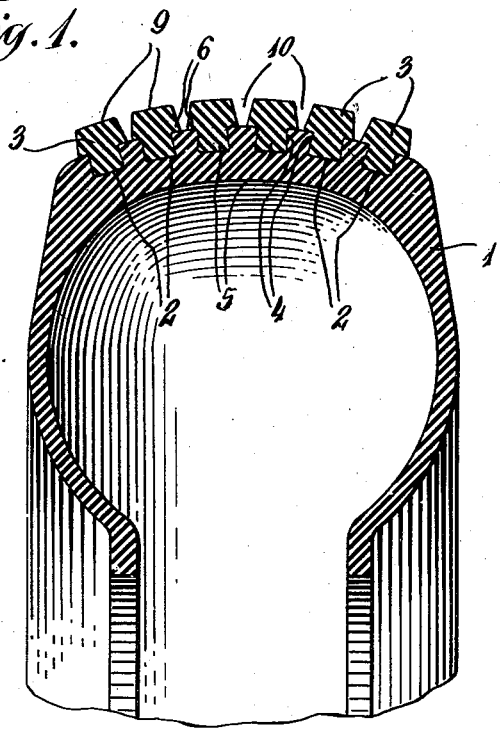
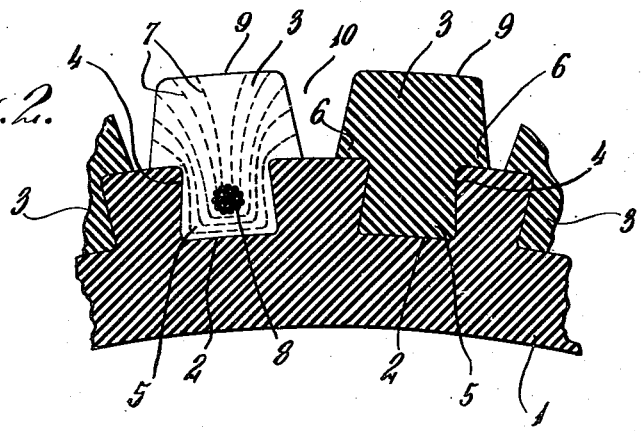
INVENTOR
Thomas J. Stephens
BY Ward Crosby & Neal
ATTORNEYS Patented Sept. 2, 1941

2,254,329

UNITED STATES PATENT OFFICE 2,254,329

REPLACEABLE TREAD TIRE

Thomas J. Stephens, Lancaster, Pa.

Application June 17, 1939, Serial No. 279,624

4 Claims. (Cl. 152—188)

The general idea has long been known of providing vehicle tires with detachable tread members which could be replaced when worn out without requiring replacement of the tire casing proper, but tires of this type have not enjoyed substantial practical use. The present invention relates to tires of the above mentioned type, and aims primarily to provide such a tire wherein the advantages of a replaceable tread may be obtained without entailing offsetting objections or disadvantages rendering the tire unsuitable for practical use. In one of its aspects the invention aims to provide a replaceable tread and tire casing construction by which the replaceable tread members will be effectively locked against accidental detachment, even through the tire should become deflatted in use, and yet capable of reasonably convenient removal and replacement of the tread members when desired. In another aspect the invention aims to provide replaceable tread members so related to each other and to the tire casing as to provide an exceedingly efficient road-engaging surface from the standpoint of traction and braking characteristics. Further objects and advantages of the invention will be in part obvious and in part specifically referred to in the description hereinafter contained which, taken in conjunction with the accompanying drawing, discloses the invention as carried out by a tire having certain preferred specific features of construction, which however should be considered merely illustrative from the standpoint of the invention in its broader aspects. In the drawing—

Fig. 1 is a cross sectional view taken through a tire casing having replaceable tread members in assembled relation with respect thereto, and which are constructed to operate in accordance with the invention.

Fig. 2 is a fragmentary section similar to Fig. 1 and shown on an enlarged scale.

In carrying out the invention I provide a tire casing I having a series of annular grooves 2 spaced across its periphery, and in which a series of replaceable tread members 3 surrounding casing I, are respectively received. In other respects the casing I may be considered as of construction similar to those in common use.

In accordance with that aspect of the invention having more particularly to do with locking the replaceable tread members securely in place during use, I provide the grooved portions of casing I with annular side walls 4 which overhang the grooves 2, thus providing the grooves with relatively narrow mouths and wider bottoms. The tread members 3 are provided with inwardly projecting base portions 5 of flaring cross section, as shown most plainly in Fig. 2, and the body portions of the tread members are provided with transversely extending portions 6, which seat upon the overhanging side walls 4 above mentioned when the tread members are in operative relation to the casing I. When the tire is in use the transversely extending portions 6 above referred to effectively hold the base portions 5 and overhanging walls 4 in locked relation to each other, even though the tire should become soft; and yet the grooves 2 may be opened up to release the tread members 3, or to permit the insertion of new similar tread members, by distorting casing I when deflated, in such manner as to cause the periphery thereof to bulge outwardly into more sharply convex shape. This may be done by pressing inwardly on the sides of the shoe, a condition which is not likely to occur accidentally when the tire is on the wheel and in use even though the tire becomes flat, and thus the tread members are not likely to become accidentally detached while in use, but by locally distorting successive peripheral sectors of the casing I as above described, the tread members 3 may be readily removed or inserted. These tread members 3 may be in the form of unitary complete rings, or in long pieces or coils from which the proper lengths are cut as needed.

To promote water tightness of the joints, the tread members 3 may be cemented in place by the use of known rubber cements, and still be detachable with reasonable facility.

As indicated at the right of Fig. 2, the tread members 3 may be of plain rubber, or they may have a suitable fabric reinforcement or the like combined therewith as indicated by the dotted lines 7 shown in connection with the left hand tread members 3 of Fig. 2, and suitable reinforcing wires, cords, or metallic cables as indicated at 8 in Fig. 2, may be employed, if desired. In any event the manufacture of the replaceable tread members 3 need not involve manufacturing operations materially different from those commonly used in the manufacture of stuffing box packings or V type belts as made either in ring form or in lengths.

In accordance with that phase of the invention having particularly to do with the road-engaging characteristics of the treads, I prefer to construct the replaceable tread members 3 with outwardly extending portions which taper in width down to relatively narrow road-engaging peripheral portions 9, which are thus spaced apart to provide peripheral annular grooves or depressions 10 alternating therewith. Thus the replaceable tread members are relatively wide and securely held at the periphery of casing 1, but the road engaging portions 9 of the tread members may flex to promote better traction and braking effects. This last mentioned feature of the invention preferably is used in conjunction with the previously described self-locking features of the casing and tread members, and either plain or irregular surfaces of tread members may be used.

While the invention has been disclosed as carried out by the aid of certain specific arrangements of parts, it should be understood that many changes may be made therein without departing from the invention in its broader aspects, within the scope of the appended claims.

I claim:

1. A replaceable tread tire including a tire casing having disposed across its periphery a series of substantially parallel annular grooves of uniform cross section alternating with annular ridges which are interposed respectively between adjacent grooves, said ridges having side walls respectively overhanging inner portions of respectively adjacent grooves, and a plurality of replaceable tread members engaging respectively in said grooves, said tread members extending around the casing and projecting outwardly therefrom, said tread members being provided with base portions which are enlarged at inner parts thereof to fit in the respective grooves and interlock with the respectively adjacent overhanging side walls of the casing, said tread members also having transversely extending portions seating upon the peripheries of the respectively adjacent ridges of the casing, the peripheral portions of adjacent tread members being spaced from each other to provide a plurality of spaced road engaging annular ridges having annular peripheral grooves interposed therebetween and alternating therewith.

2. A replaceable tread tire including a tire casing having disposed across its periphery a series of substantially parallel annular grooves of uniform cross section alternating with annular ridges, and a plurality of replaceable tread members engaging respectively in said grooves, the engaging portions of said tread members and the side walls of said ridges interlocking to form a solid mass of material extending crosswise of the tire to anchor tread members firmly in the casing under pressure of the load on the tire, the peripheral portions of adjacent tread members being spaced from each other to provide a plurality of spaced road engaging annular ridges having annular peripheral grooves interposed therebetween and alternating therewith.

3. A replaceable tread tire including a tire casing having disposed across its periphery a series of substantially parallel annular grooves of uniform cross section alternating with annular ridges which are interposed respectively between adjacent grooves, said ridges having side walls respectively overhanging inner portions of respectively adjacent grooves, and a plurality of replaceable tread members engaging respectively in said grooves, said tread members extending around the casing and projecting outwardly therefrom, said tread members being provided with base portions which are enlarged at inner parts thereof to fit in the respective grooves and interlock with the respectively adjacent overhanging side walls of the casing, the peripheral portions of adjacent tread members being spaced from each other to provide a plurality of spaced road engaging annular ridges having annular peripheral grooves interposed therebetween and alternating therewith.

4. A tire casing of the character described having disposed across its periphery a series of annular grooves alternating with annular ridges which are interposed respectively between adjacent grooves, the peripheral portions of said ridges being wider than inner portions thereof, thereby to provide grooves which are of relatively restricted width at their peripheral portions, and a separate tread member fitted into each groove to form a series of road engaging ridges on the periphery of the casing, said tread members being anchored in the grooves by their mutual co-acting pressure against the side walls and the peripheries of the intermediate casing ridges, said pressure being caused by internal pressure in the casing, said tread member being of uniform cross section and provided on each side with a flange seating respectively upon the peripheries of adjacent casing ridges.

THOMAS J. STEPHENS.